(12) United States Patent
Borgmann et al.

(10) Patent No.: US 12,015,839 B2
(45) Date of Patent: Jun. 18, 2024

(54) INSPECTION VEHICLE

(71) Applicant: Siemens Energy Global GmbH & Co. KG, Bayern (DE)

(72) Inventors: Christian Borgmann, Dorsten (DE); Michael Clossen-von Lanken Schulz, Issum (DE); Paul Dreischer, Bochum (DE); Stefan Obermayr, Duisburg (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 394 days.

(21) Appl. No.: 17/610,467

(22) PCT Filed: Apr. 17, 2020

(86) PCT No.: PCT/EP2020/060846
§ 371 (c)(1),
(2) Date: Nov. 11, 2021

(87) PCT Pub. No.: WO2020/233917
PCT Pub. Date: Nov. 26, 2020

(65) Prior Publication Data
US 2022/0224809 A1    Jul. 14, 2022

(30) Foreign Application Priority Data
May 17, 2019    (DE) .................... 10 2019 207 248.8

(51) Int. Cl.
*H04N 23/57*   (2023.01)
*G02B 26/08*   (2006.01)
*H04N 23/51*   (2023.01)

(52) U.S. Cl.
CPC ......... *H04N 23/57* (2023.01); *G02B 26/0816* (2013.01); *H04N 23/51* (2023.01)

(58) Field of Classification Search
CPC ..... H04N 23/57; H04N 23/51; G02B 26/0816
(Continued)

(56) References Cited

U.S. PATENT DOCUMENTS

| 4,010,636 A | 3/1977 | Clark et al. |
| 5,563,357 A | 10/1996 | Longree |

(Continued)

FOREIGN PATENT DOCUMENTS

| CN | 1081507 A | 2/1994 |
| CN | 1167359 A | 12/1997 |

(Continued)

OTHER PUBLICATIONS

Zhang George et al: "A modular air-gap crawler for motor and generator in-situ inspection", 2015 IEEE International Conference on Industrial Technology (ICIT), IEEE, Mar. 17, 2015 (Mar. 17, 2015), pp. 3166-3171, XP032785508, DOI: 10.1109/ICIT.2015.7125565.

(Continued)

*Primary Examiner* — Matthew David Kim
(74) *Attorney, Agent, or Firm* — Wolter Van Dyke Davis, PLLC (57) ABSTRACT

An inspection vehicle which is designed to be inserted into the air gap between a rotor and a stator of an electrical machine, in particular of a generator, and to be moved on the substantially cylindrical outer circumference of the rotor in order to inspect the outer circumference of the rotor and/or the inner circumference of the stator for damage.

14 Claims, 5 Drawing Sheets

(58) Field of Classification Search
USPC .......................................................... 348/131
See application file for complete search history.

(56) References Cited

U.S. PATENT DOCUMENTS

| | | | |
|---|---|---|---|
| 5,650,579 A * | 7/1997 | Hatley | B62D 55/065 |
| | | | 348/E7.086 |
| 5,778,518 A | 7/1998 | Huber et al. | |
| 5,969,531 A | 10/1999 | Murakami | |
| 7,201,055 B1 | 4/2007 | Bagley | |
| 10,875,591 B2 * | 12/2020 | Lunkenbein | B62D 55/244 |
| 2002/0135383 A1 | 9/2002 | Haeusermann | |
| 2007/0277629 A1 * | 12/2007 | Bagley | B62D 63/02 |
| | | | 73/865.8 |
| 2008/0308324 A1 | 12/2008 | Moser | |
| 2009/0256584 A1 | 10/2009 | Moser | |
| 2013/0140801 A1 * | 6/2013 | Schlee | B62D 57/024 |
| | | | 280/762 |
| 2015/0276931 A1 | 10/2015 | Airoldi | |
| 2016/0194038 A1 * | 7/2016 | Jean | B62D 55/244 |
| | | | 305/15 |
| 2016/0347363 A1 * | 12/2016 | Fang | B62D 9/00 |
| 2016/0359396 A1 | 12/2016 | Lambert et al. | |
| 2018/0128879 A1 * | 5/2018 | Kuwahara | B25J 5/005 |
| 2018/0188187 A1 * | 7/2018 | Lakhani | H04N 23/56 |
| 2019/0329399 A1 * | 10/2019 | Mizuno | B62D 55/06 |
| 2020/0239090 A1 * | 7/2020 | Kong | B60C 11/0306 |
| 2021/0181154 A1 * | 6/2021 | Clossen-von Lanken Schulz | |
| | | | G01N 29/046 |
| 2021/0291916 A1 * | 9/2021 | Kautsch | B62D 55/0655 |
| 2021/0339393 A1 * | 11/2021 | Dan | B25J 5/007 |

FOREIGN PATENT DOCUMENTS

| | | |
|---|---|---|
| CN | 1370998 A | 9/2002 |
| CN | 101082654 A | 12/2007 |
| CN | 101387687 A | 3/2009 |
| CN | 101567609 A | 10/2009 |
| CN | 101653937 A | 2/2010 |
| CN | 104949625 A | 9/2015 |
| CN | 106533073 A | 3/2017 |
| DE | 102017220274 A1 | 5/2019 |
| EP | 0748030 A2 | 12/1996 |
| EP | 2096738 A1 | 9/2009 |
| EP | 2345902 A1 | 7/2011 |
| WO | 2015095543 A1 | 6/2015 |

OTHER PUBLICATIONS

PCT International Search Report and Written Opinion of International Searching Authority dated Jul. 9, 2020 corresponding to PCT International Application No. PCT/EP2020/060846 filed Apr. 17, 2020.

Shuo, Yuan, "Design and Optimization of the Adsorption Unit for a Stator Fault Detection Robot," Master's Degree Thesis of Shanghai Institute of Electrical Engineering; Shanghai Dianji University, 2018, 140-547; Dec. 2018; English abstract on p. 6.

* cited by examiner

INSPECTION VEHICLE

CROSS REFERENCE TO RELATED APPLICATIONS

This application is the US National Stage of International Application No. PCT/EP2020/060846 filed 17 Apr. 2020, and claims the benefit thereof. The International Application claims the benefit of German Application No. DE 10 2019 207 248.8 filed 17 May 2019. All of the applications are incorporated by reference herein in their entirety.

FIELD OF INVENTION

The invention relates to an inspection vehicle which is conceived to be inserted into the air gap between a rotor and a stator of an electric machine, in particular of a generator, and to be moved on the substantially cylindrical external circumference of the rotor so as to inspect the external circumference of the rotor and/or the internal circumference of the stator for damage, said inspection vehicle comprising a housing which is configured so as to be in particular substantially rectangular and has a housing front side that points in the main direction of travel, an opposite housing rear side, housing longitudinal sides that are disposed so as to be mutually opposite and connect the housing front side and the housing rear side to one another, a housing lower side that in the inserted state of the inspection vehicle points toward the rotor, and an opposite housing upper side; inspection technology which is at least largely received in the housing; and at least four traction groups.

BACKGROUND OF INVENTION

The rotor and the stator of a generator of a stationary gas turbine plant are subjected to visual inspection at regular revision intervals and optionally when extraordinary events arise, such as in the event of load shedding, for example, so as to establish and locate in particular thermal discolorations, mechanical changes in the form of scratches, impacts, displacement of parts or the like, loose parts, foreign matter, etc. In order for visual access to be enabled, the rotor is uninstalled from the stator, or extracted from the latter. A visual inspection by the inspection personnel takes place by eye. Potential findings are photographically documented. The generator can be reassembled and put back in operation again only once the inspection has been completed and the inspection results have been evaluated, and optionally after any repair work required. The extraction of the rotor is associated with great complexity and high costs. Against this background, it would be desirable to be able to carry out the inspection in the assembled state of the generator such that the uninstallation of the rotor can be dispensed with in the absence of any findings.

In principle, the potential for a visual inspection in the assembled state lies in the use of a conventional industrial endoscope. This however does not apply to generators of stationary gas turbine plants with rotors of several meters in length.

Furthermore, inspection vehicles which are inserted into the air gap between the rotor and the stator are known, such as the crawler system marketed by ABB company under the product name "Air Gap Inspector". This system comprises a housing which is configured so as to be substantially rectangular and has a housing front side that points in the main direction of travel, an opposite housing rear side, housing longitudinal sides that are disposed so as to be mutually opposite and connect the housing front side and the housing rear side to one another, a housing lower side that in the inserted state of the inspection vehicle points toward the rotor, and an opposite housing upper side; inspection technology which is at least largely received in the housing; and four traction groups. The first two traction groups are held on the housing longitudinal sides so as to be pivotable up and down about pivot axes that extend in the main direction of travel. The two other traction groups in turn are held on the first two traction groups so as to be pivotable up and down about pivot axes that likewise extend in the main direction of travel. Accordingly, the individual traction groups during axial travel across a rotor place themselves around the circumference of the latter. Each traction group possesses a chain drive that enables the forward movement of the crawler system. However, the use of such a crawler system for visually inspecting the rotor and the stator is not possible in many generators, in particular those in the industrial sector, because the air gap between the rotor and the stator is in most instances accessible only by way of a unilateral access at the 12 o'clock position, but these crawler systems after each inspection run have to be manually repositioned in the circumferential direction in the axial direction of the rotor in order to be able to carry out the next inspection run in the axial direction.

SUMMARY OF INVENTION

Proceeding from this prior art, it is an object of the present invention to enable an alternative inspection of the type described above.

In order for this object to be achieved, the present invention achieves an inspection vehicle of the type mentioned at the outset, said inspection vehicle being characterized in that the traction groups are held in pairs so as to be opposite one another on the housing longitudinal sides, in that each traction group has at least two wheels which by separate motors are able to be driven so as to rotate about mutually parallel wheel axes that extend so as to be perpendicular to the main direction of travel, and in that each traction group is fastened to an intermediate element so as to be pivotable about a first pivot axis that extends so as to be parallel to the wheel axes, said intermediate element in turn being fastened to the housing so as to be pivotable about a second pivot axis that extends so as to be parallel to the first pivot axis, and so as to be pivotable up and down about a third pivot axis that extends so as to be perpendicular to the second pivot axis, wherein the pivoting movement of one traction group about the third pivot axis thereof is coupled to the pivoting movement of the opposite traction group about the third pivot axis thereof. This configuration and disposal of the traction groups enables the inspection vehicle according to the invention to travel, to be steered and to be reversed in each direction on a rotor. Once said inspection vehicle has been placed on the rotor, said inspection vehicle can thus be freely moved in all directions. This also enables the inspection of the rotor and of the stator of generators in which the air gap between the rotor and the stator is accessible only by way of a unilateral access at the 12 o'clock position, without the rotor having to be extracted for this purpose. Accordingly, the inspection can be carried out rapidly and in a cost-effective manner. The operation of the vehicle and of the inspection technology advantageously takes place so as to be entirely remote-controlled, thus in a wireless manner. The steering is advantageously implemented in that the wheels of the traction groups of both sides are driven at different speeds, in a manner analogous to that of a tracked vehicle.

According to one design embodiment of the present invention, the inspection technology has at least one camera and one illumination unit for illuminating the imaging region of the at least one camera, wherein the illumination unit can be integrated in the camera. Additionally or alternatively to one or a plurality of cameras, the inspection technology may however also have other inspection apparatuses, for example ultrasonic inspection apparatuses or the like.

The camera is advantageously disposed in the interior of the housing and directed onto a mirror which in the interior of the housing is disposed between two windows provided so as to be opposite one another on the housing lower side and on the housing upper side and is held so as to be pivotable, in particular in a motorized manner, about a mirror pivot axis in such a manner that the camera, as a function of the pivoted position of the mirror, observes the rotor through the lower window or the stator through the upper window. Accordingly, the external circumferential face of the rotor as well as the internal circumferential face of the stator can be inspected by a single camera.

The camera is advantageously able to be moved, in particular in a motorized manner, back and forth relative to the mirror. Since the external circumferential face of the rotor and the internal circumferential face of the stator are situated at different spacings from the housing, the focus of the camera can in this way be adjusted as a function of the face to be inspected.

The housing upper side above the camera is advantageously provided with a passage opening, wherein the camera is able to be moved, in particular in a motorized manner, up and down through the passage opening between a first position, in which said camera is disposed within the housing and directed onto the mirror, and a second position, in which said camera is disposed outside the housing. The rotor or the stator can thus be inspected by the camera in the first position. The camera in the second position is aligned in the main direction of travel so that an operator can see where the inspection vehicle has to be steered. Only a single camera is thus required in total. In principle however, it is of course also possible for a plurality of cameras to be provided, for example one camera for inspecting the rotor surface, one camera for inspecting the stator surface, and a further camera for looking in the main direction of travel.

The inspection technology and the motors are advantageously supplied with power by way of at least one accumulator that is disposed within the housing.

The intermediate elements of traction groups disposed opposite one another, by way of a lever mechanism, are advantageously coupled to one another in such a manner that, when one of the two traction groups is pivoted downward by a predetermined degree about the third pivot axis assigned to this traction group, the other of the two traction groups is pivoted upward by a corresponding degree about the third pivot axis assigned to that traction group, and vice versa. Accordingly, it is ensured that the traction groups, and thus the respective wheels thereof, are optimally positioned at all times even during oblique travel across a rotor.

According to one design embodiment of the present invention, each traction group has three wheels that are disposed so as to be mutually offset in the main direction of travel and by separate motors are in each case driven so as to rotate about the wheel axes of said wheels. In this way, it is ensured that the propulsion of the vehicle is guaranteed by the other wheels even when one of the wheels should be jammed in an air-cooling bore of a rotor, for example.

Magnets are advantageously disposed at least on the lower sides of the traction groups, advantageously also on the housing lower side. The desired contact pressure for the propulsion of the vehicle is ensured by way of such magnets. It is also possible for the vehicle to be moved upside-down along a rotor.

The overall height of the vehicle, when the latter is placed on a level surface, is advantageously less than 20 mm, more advantageously even less than 16 mm. Accordingly, almost all industrial generators can be inspected by the vehicle according to the invention.

BRIEF DESCRIPTION OF THE DRAWINGS

Further features and advantages of the present invention will become evident by means of the description hereunder of an inspection vehicle according to one embodiment of the present invention, with reference to the appended drawing in which.

DETAILED DESCRIPTION OF INVENTION

The figures show an inspection vehicle 1 according to one embodiment of the present invention, said inspection vehicle being conceived to be inserted into the air gap between a rotor and a stator of an electric machine, in particular of a generator of a stationary gas turbine plant, and to be moved on the substantially cylindrical external circumference of the rotor so as to inspect the external circumference of the rotor and/or the internal circumference of the stator for damage. The inspection vehicle 1 as main components comprises a housing 2, inspection technology 3 which is received in the housing 2, and four traction groups 4.

The housing 2 is configured so as to be substantially rectangular. Said housing 2 has a housing front side 6 which points in the main direction of travel identified by the arrow 5, an opposite housing rear side 7, housing longitudinal sides 8 that are disposed so as to be mutually opposite and connect the housing front side 6 and the housing rear side 7 to one another, a housing lower side 9 that in the inserted state of the inspection vehicle 1 points toward the rotor, and an opposite housing upper side 10.

Figure 1:
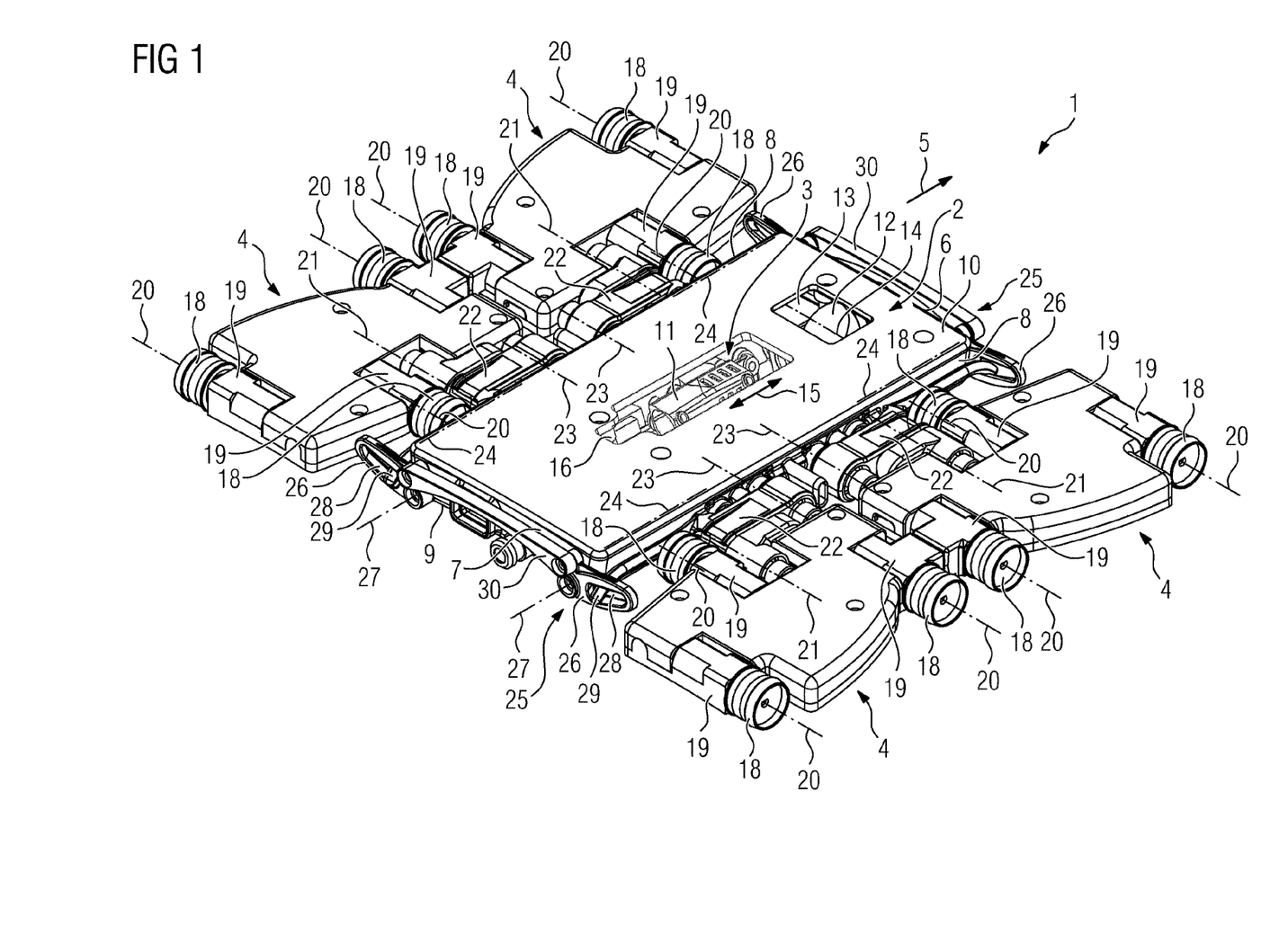
FIG. 1 shows a perspective rear view, from obliquely above, of an inspection vehicle according to one embodiment of the present invention, wherein a camera is situated in a first lower position.
Figure 2:
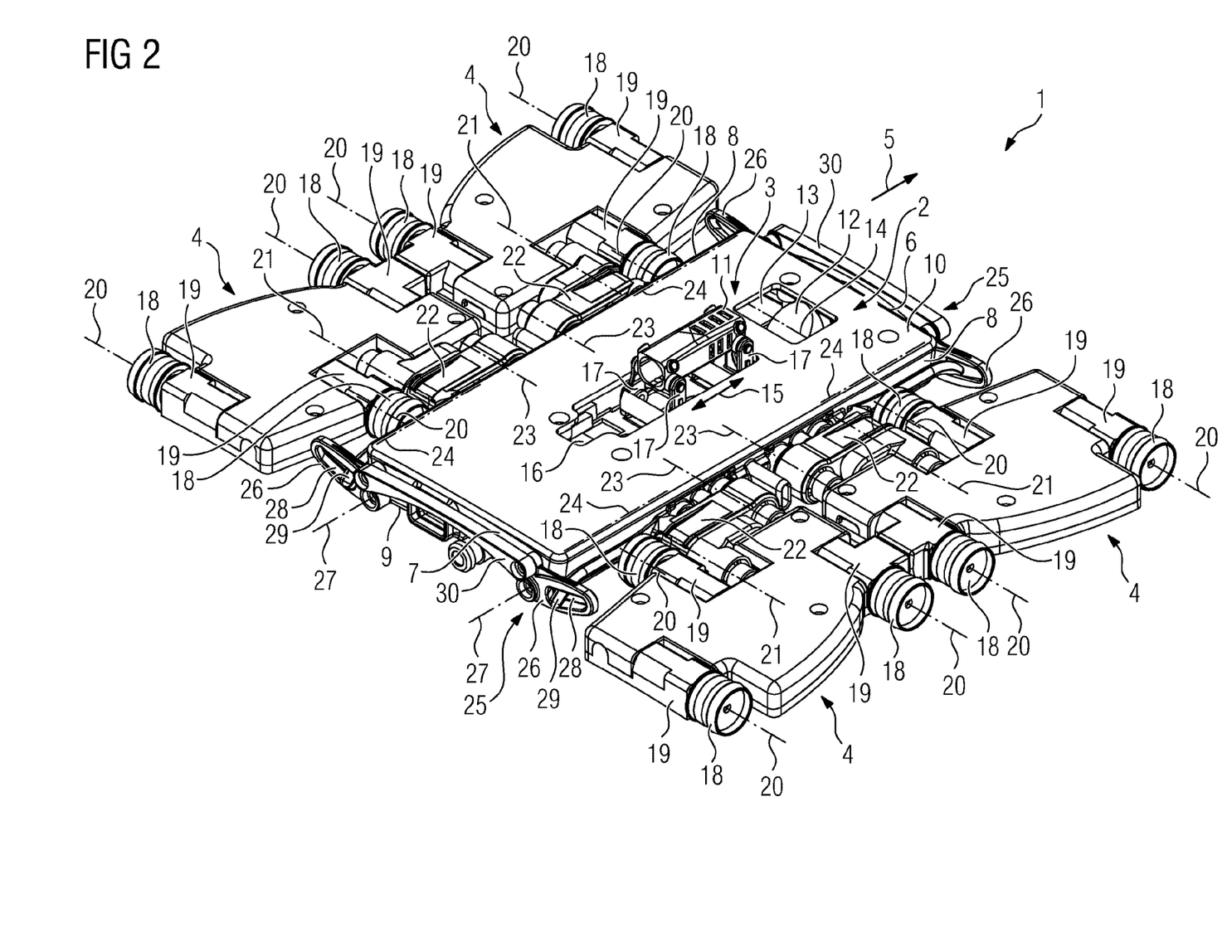
FIG. 2 shows a view analogous to that of FIG. 1, wherein the camera is situated in a second upper position.
Figure 3:
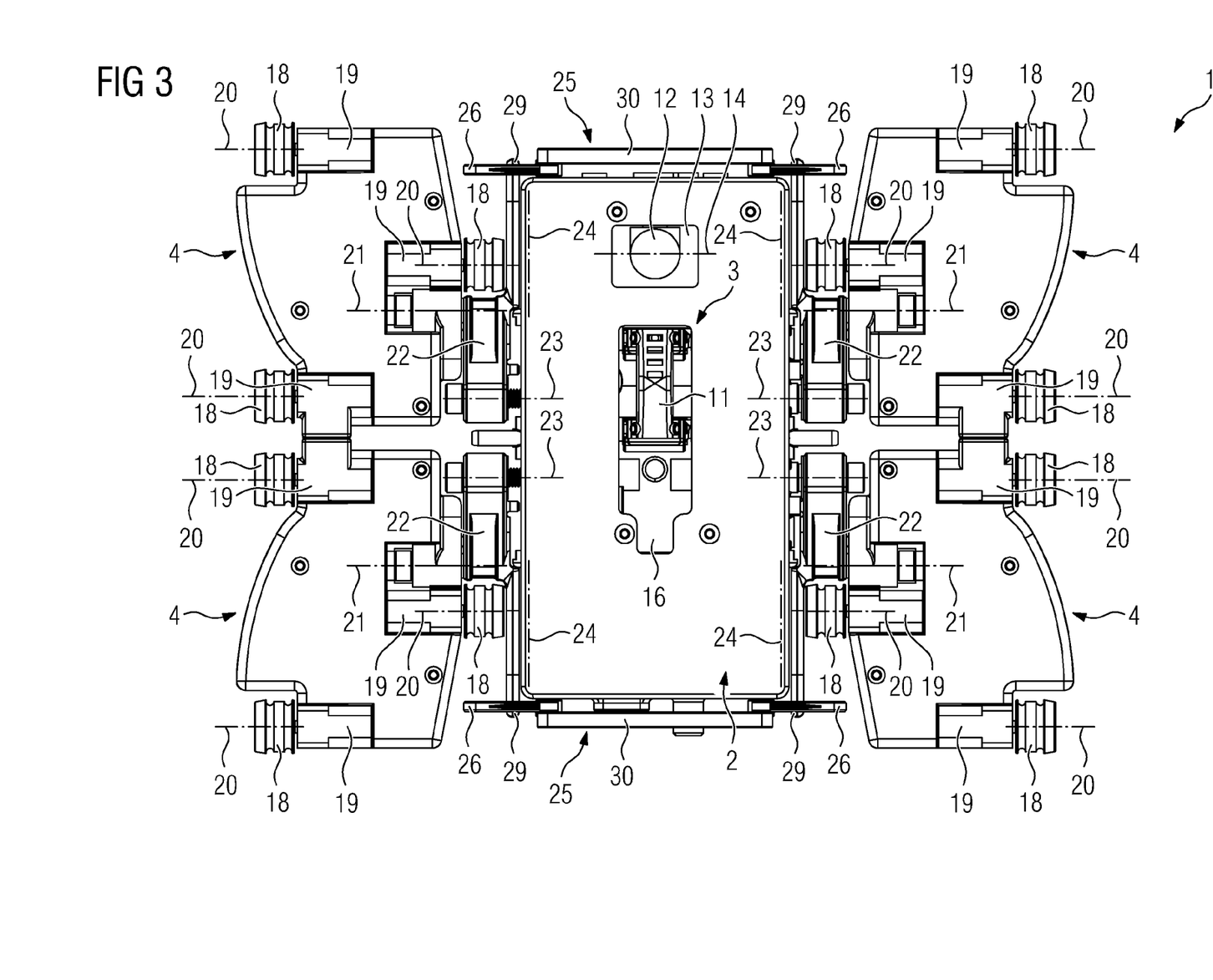
FIG. 3 shows a plan view of the inspection vehicle shown in FIG. 2.
Figure 4:
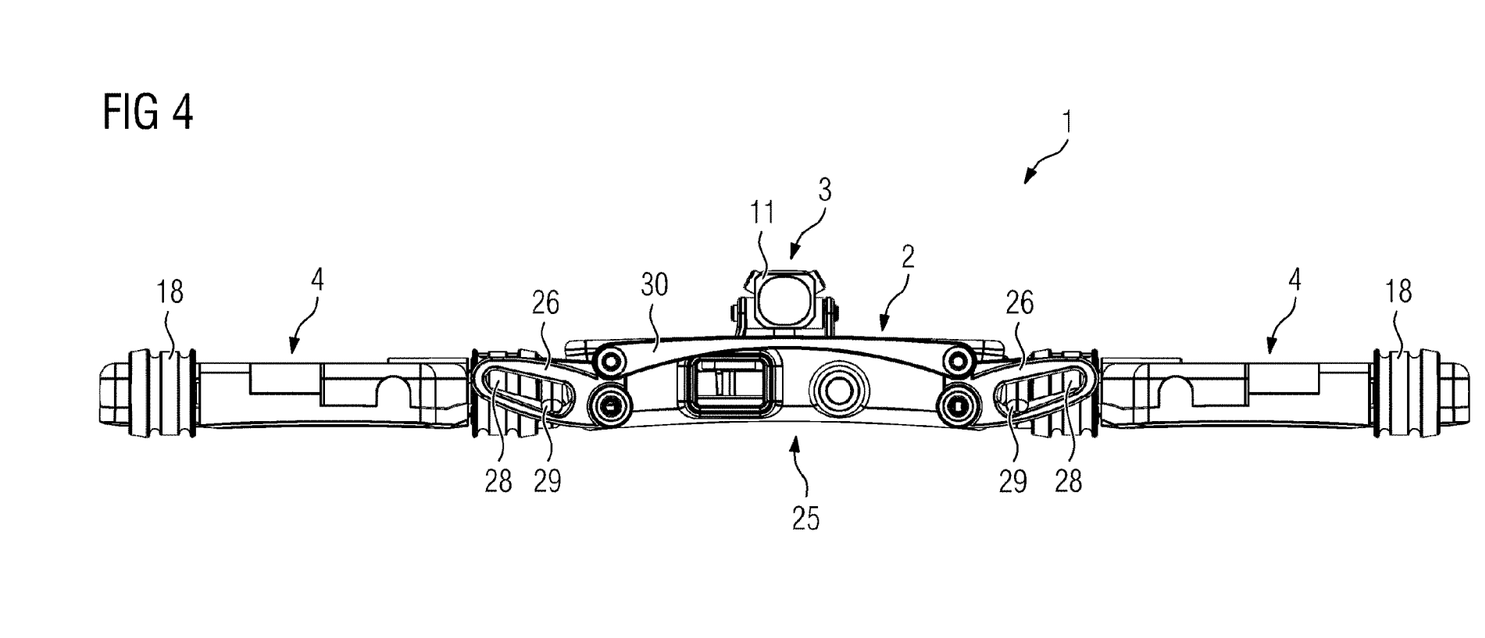
FIG. 4 shows a front view of the inspection vehicle shown in FIG. 2.
Figure 5:
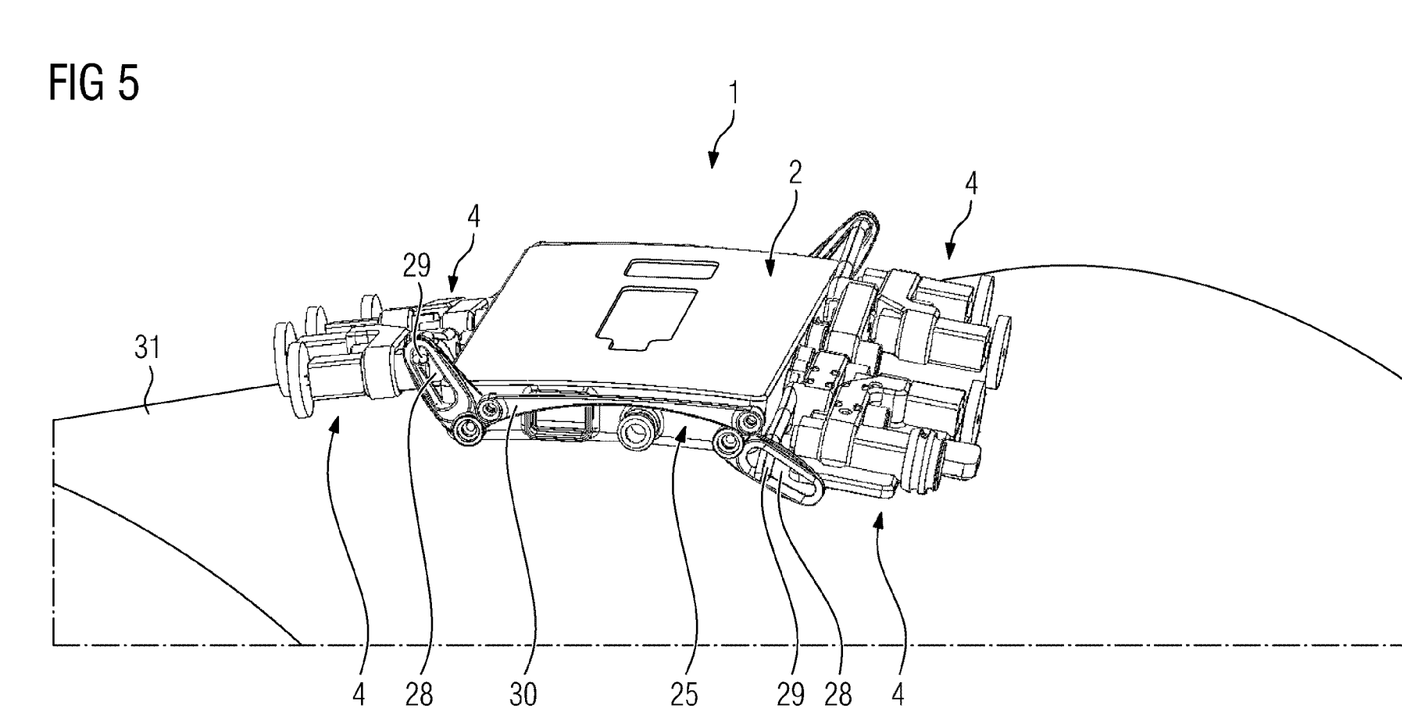
FIG. 5 shows a perspective view of an inspection vehicle during oblique travel across a rotor, in a modified embodiment in comparison to FIG. 1.

The inspection technology 3 is received within the housing 2, said inspection technology 3 presently having a camera 11 with an integrated illumination unit for illuminating the imaging region of the camera, as well as a mirror 12. The camera 11 in the main direction of travel is directed onto the mirror 12 which in the interior of the housing 2 is disposed between two windows 13 provided so as to be opposite one another on the housing lower side 9 and on the housing upper side 10 and is held so as to be pivotable in a motorized manner about a mirror pivot axis 14, extending transversely to the main direction of travel, in such a manner that the camera 11, as a function of the pivoted position of the mirror 12, selectively observes the rotor through the lower window 13 or the stator through the upper window 13 when the inspection vehicle 1 is placed on a rotor. In order for the focus of the camera 11 to be able to be adjusted in an optimal manner, the camera 11 is able to be moved in a motorized manner along guides, not illustrated in more detail, back and forth in the direction of the arrow 15 relative to the mirror 12. Alternatively, such mobility may also be dispensed with and a fixed focus can be set. Furthermore, the camera 11 is able to be moved in a motorized manner up and down between a first lower position, in which said camera is disposed within the housing 2 and directed onto the mirror 12, and a second upper position, in which said camera is guided out of the housing 2 through a passage opening 16 that is provided above the camera 11 on the housing upper side 10. The first position is illustrated in FIG. 1, while the second position is illustrated in FIG. 2. The upward and downward movement is presently implemented by way of pivot levers 17 that are driven in a motorized manner. The rotor or the stator can thus be inspected with the camera 11 in the first position. The camera 11 in the second position is aligned in the main direction of travel such that an operator can see where the inspection vehicle 1 has to be steered.

The traction groups 4 are held in pairs so as to be opposite one another on the housing longitudinal sides 8. Each traction group 4 presently has three wheels 18 which are disposed so as to be mutually offset in the main direction of travel and by separate motors 19 are in each case able to be driven so as to rotate about mutually parallel wheel axes 20 that extend so as to be perpendicular to the main direction of travel. Each traction group 4 is fastened to an intermediate element 22 so as to be pivotable about a first pivot axis 21 that extends so as to be parallel to the wheel axes 20, said intermediate element 22 in turn being fastened to the housing 2 so as to be pivotable about a second pivot axis 23 that extends so as to be parallel to the first pivot axis 21, and so as to be pivotable up and down about a third pivot axis 24 that extends so as to be perpendicular to the second pivot axis 23 in the main direction of travel. The pivoting movement of one traction group 4 about the third pivot axis 24 thereof is coupled to the pivoting movement of the opposite traction group 4 about the third pivot axis 24 thereof. This coupling presently takes place in each case by way of a lever mechanism 25, wherein the lever mechanism 25 of the front two traction groups 4 extends along the housing front side 6, and the lever mechanism 25 of the rear two traction groups 4 extends along the housing rear side 7. Each lever mechanism 25 comprises two L-shaped levers 26 which are in each case fastened to the housing front side 6, or the housing rear side 7, respectively, so as to be rotatable about rotation axes 27 that extend so as to be mutually parallel in the main direction of travel. Laterally outward-directed legs of the respective levers 26 are provided with slots 28, a free end of an activation portion 29 of an assigned intermediate element 22 engaging in said slots 28. The levers 26 of a lever mechanism 25 on the respective other legs are connected to one another in an articulated manner by way of a connecting rod 30. When one of two traction groups 4 that are disposed so as to be opposite one another is thus pivoted downward by a predetermined degree about the third pivot axis 24 assigned to this traction group 4, the other of the two traction groups 4 is thus pivoted upward by a corresponding degree about the pivot axis 24 assigned to that traction group 4, and vice versa, as can be readily seen in particular in FIG. 5.

The dimensions of the housing 2 and of the traction groups 4 are chosen in such a manner that the overall height H of the inspection vehicle 1, when the camera 11 is situated in the first position thereof, is less than 20 mm, advantageously even less than 16 mm. A multiplicity of magnets, not illustrated in more detail, are disposed on the lower sides of the housing 2 and of the traction groups, said magnets holding the inspection vehicle 1 on the rotor 31 when said inspection vehicle 1 is placed onto a rotor 31 according to FIG. 5, wherein the strength, arrangement and number of magnets, the latter being neodymium magnets, for example, is in particular chosen in such a manner that the inspection vehicle 1 can also be moved upside-down along the rotor 31. The actuation of the inspection technology 3 and of the traction groups 4 presently takes place by wireless or remote control, thus without a cable.

While the invention has been illustrated and described in detail by the exemplary embodiment, the invention is not limited by the disclosed examples and other variations can be derived therefrom by a person skilled in the art without departing from the scope of protection of the invention.

The invention claimed is:

1. An inspection vehicle which is adapted to be inserted into an air gap between a rotor and a stator of an electric machine and/or a generator, and to be moved on a substantially cylindrical external circumference of the rotor so as to inspect the external circumference of the rotor and/or an internal circumference of the stator for damage, said inspection vehicle comprising:
   a housing which has a housing front side that points in the main direction of travel, an opposite housing rear side, housing longitudinal sides that are disposed so as to be mutually opposite and connect the housing front side and the housing rear side to one another, a housing lower side that in an inserted state of the inspection vehicle points toward the rotor, and an opposite housing upper side;
   inspection technology which is at least largely received in the housing; and
   at least four traction groups;
   wherein the traction groups are held in pairs so as to be opposite one another on the housing longitudinal sides, wherein each traction group has at least two wheels which by separate motors are able to be driven to as to rotate about mutually parallel wheel axes that extend so as to be perpendicular to the main direction of travel; and
   wherein each traction group is fastened to an intermediate element so as to be pivotable about a first pivot axis that extends so as to be parallel to the wheel axes, said intermediate element in turn being fastened to the housing so as to be pivotable about a second pivot axis that extends so as to be parallel to the first pivot axis, and so as to be pivotable up and down about a third pivot axis that extends so as to be perpendicular to the second pivot axis,
   wherein the pivoting movement of one traction group about the third pivot axis thereof is coupled to the pivoting movement of the opposite traction group about the third pivot axis thereof.

2. The inspection vehicle as claimed in claim 1, wherein the inspection technology has at least one camera and one illumination unit for illuminating an imaging region of the at least one camera, wherein the illumination unit can be integrated in the camera.

3. The inspection vehicle as claimed in claim 2,
wherein the camera is disposed in the interior of the housing and directed onto a mirror which in the interior of the housing is disposed between two windows provided so as to be opposite one another on the housing lower side and on the housing upper side and the mirror is held so as to be pivotable about a mirror pivot axis in such a manner that the camera, as a function of the pivoted position of the mirror, observes the rotor through a lower window or the stator through an upper window.

4. The inspection vehicle as claimed in claim 3,
wherein the camera is able to be moved back and forth relative to the mirror.

5. The inspection vehicle as claimed in claim 4,
wherein the camera is movable in a motorized manner.

6. The inspection vehicle as claimed in claim 3,
wherein the camera is aligned in the main direction of travel, wherein the housing upper side above the camera is provided with a passage opening, and
wherein the camera is able to be moved up and down through the passage opening between a first position, in which said camera is disposed within the housing and directed onto the mirror, and a second position, in which said camera is disposed outside the housing.

7. The inspection vehicle as claimed in claim 3,
wherein the mirror is pivotable in a motorized manner.

8. The inspection vehicle as claimed in claim 1,
wherein the inspection technology and the motors are supplied with power by way of at least one accumulator that is disposed within the housing.

9. The inspection vehicle as claimed in claim 1,
wherein the intermediate elements of traction groups disposed opposite one another, by way of a lever mechanism, are coupled to one another in such a manner that, when one of the two traction groups is pivoted downward by a predetermined degree about the third pivot axis assigned to this traction group, the other of the two traction groups is pivoted upward by a corresponding degree about the third pivot axis assigned to that traction group, and vice versa.

10. The inspection vehicle as claimed in claim 1,
wherein each traction group has three wheels that are disposed so as to be mutually offset in the main direction of travel and by separate motors are in each case driven so as to rotate about the wheel axes of said wheels.

11. The inspection vehicle as claimed in claim 1,
wherein magnets are disposed at least on the lower sides of the traction groups.

12. The inspection vehicle as claimed in claim 1,
wherein an overall height of said inspection vehicle, when the latter is placed on a level surface, is less than 20 mm.

13. The inspection vehicle as claimed in claim 12,
wherein the overall height of said inspection vehicle, when the latter is placed on a level surface, is less than 16 mm.

14. The inspection vehicle as claimed in claim 1,
wherein the housing is configured to be substantially rectangular.

* * * * *